US007589645B2

(12) United States Patent
Schmidt

(10) Patent No.: US 7,589,645 B2
(45) Date of Patent: Sep. 15, 2009

(54) SYSTEM AND METHOD FOR DETERMINING AIRCRAFT HARD LANDING EVENTS FROM INERTIAL AND AIRCRAFT REFERENCE FRAME DATA

(75) Inventor: R. Kyle Schmidt, Pickering (CA)

(73) Assignee: Messier-Dowty Inc. (CA)

( * ) Notice: Subject to any disclaimer, the term of this patent is extended or adjusted under 35 U.S.C. 154(b) by 168 days.

(21) Appl. No.: 11/423,529

(22) Filed: Jun. 12, 2006

(65) Prior Publication Data

US 2007/0008187 A1 Jan. 11, 2007

(30) Foreign Application Priority Data

Jun. 10, 2005 (CA) .................................. 2509742

(51) Int. Cl.
*G08B 21/00* (2006.01)
(52) U.S. Cl. ..................... 340/960; 340/945; 340/500
(58) Field of Classification Search ............... 340/945, 340/960, 946, 951, 500, 948
See application file for complete search history.

(56) References Cited

U.S. PATENT DOCUMENTS

| | | | |
|---|---|---|---|
| 2,722,587 A | 11/1955 | Buzzetti et al. | |
| 3,654,806 A | 4/1972 | Bateman | |
| 3,712,122 A * | 1/1973 | Harris et al. ................. | 340/945 |
| 3,927,306 A | 12/1975 | Miller | |
| 4,278,219 A | 7/1981 | Finance | |
| 4,312,042 A | 1/1982 | Bateman | |
| 4,336,595 A | 6/1982 | Adams et al. | |
| 4,850,552 A | 7/1989 | Darden et al. | |
| 5,214,586 A | 5/1993 | Nance | |
| 5,511,430 A * | 4/1996 | Delest et al. ................. | 73/802 |
| 5,548,517 A | 8/1996 | Nance | |
| 5,955,972 A | 9/1999 | Wade | |
| 6,064,924 A | 5/2000 | Fleischmann | |
| 6,169,496 B1 | 1/2001 | Martin et al. | |
| 6,354,152 B1 | 3/2002 | Herlik | |
| 6,654,685 B2 * | 11/2003 | McIntyre ..................... | 701/213 |
| 6,672,075 B1 * | 1/2004 | Sandu et al. ................. | 60/806 |

(Continued)

FOREIGN PATENT DOCUMENTS

EP 1 326 153 A1 7/2003

(Continued)

OTHER PUBLICATIONS

M. J. Brevoort, Technical Notes National Advisory Committee for Aeronautics, No. 501, Landing-Shock Recorder, Jul. 1934.

(Continued)

*Primary Examiner*—Davetta W Goins
*Assistant Examiner*—Edny Labbees
(74) *Attorney, Agent, or Firm*—Katten Muchin Rosenman LLP

(57) ABSTRACT

This invention allows for the precise determination of an aircraft's landing conditions and whether an aircraft has experienced a hard landing that exceeds the allowable design loads of the aircraft's landing gear. The system comprises a computer that measures signals from an inertial measurement unit (IMU) at high data rates (e.g. 100 Hz) and also records signals from the aircraft avionics data bus. The computer compares the output from the inertial measurement unit's accelerometers against at least one predetermined threshold parameter to determine whether the aircraft's three dimensional landing deceleration is safely within the design allowances or other regulatory limitations, or whether the landing event needs further investigation.

12 Claims, 4 Drawing Sheets

FAA Sink Rate Survey Data

U.S. PATENT DOCUMENTS 6,676,075 B2    1/2004    Cowan et al.
7,274,310 B1 *   9/2007    Nance .................. 340/960

FOREIGN PATENT DOCUMENTS

WO         93/16359 A1    8/1993
WO         96/07087 A1    3/1996
WO         98/47109 A1    10/1998

OTHER PUBLICATIONS

Gregory D. Hoshall, Introducing the MotionMaster Model EDR-6DOF, Instrumented Sensor Technology, 2005.

Transmittal, International Preliminary Report On Patentability, and the written Opinion Of The International Searching Authority for International Application No. PCT/CA2006/000947.

* cited by examiner

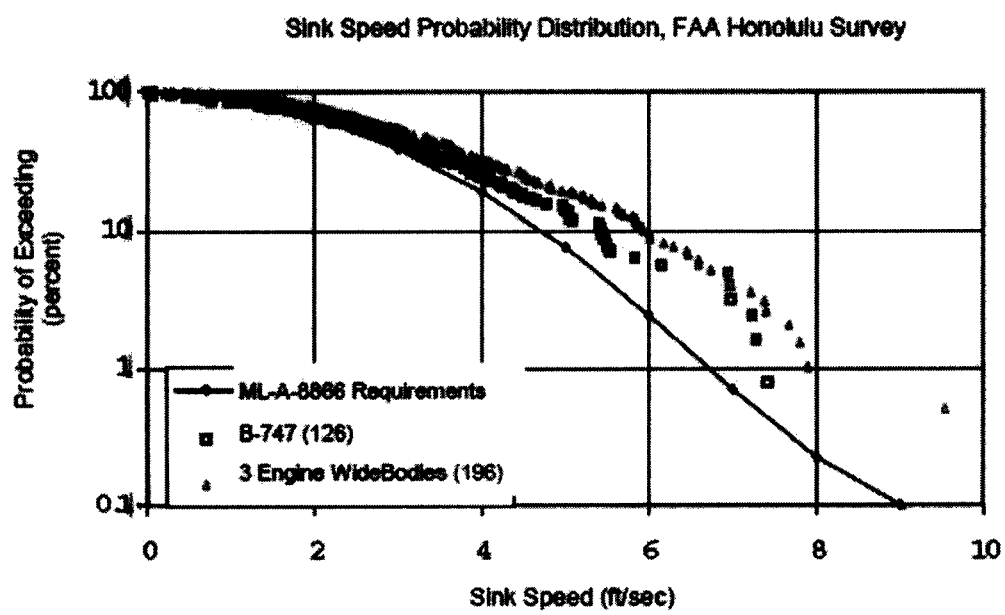
Figure 1: FAA Sink Rate Survey Data
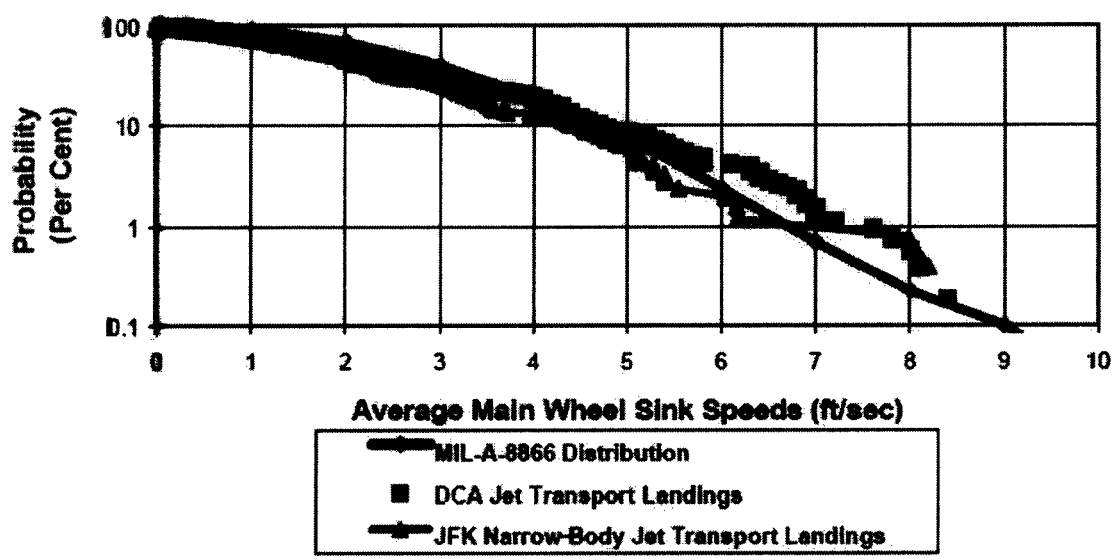
Figure 2: FAA Sink Rate Survey Data

SYSTEM AND METHOD FOR DETERMINING AIRCRAFT HARD LANDING EVENTS FROM INERTIAL AND AIRCRAFT REFERENCE FRAME DATA

FIELD OF THE INVENTION

The present invention relates to aircraft landing systems and more particularly to a method and system for determining the precise landing conditions of an aircraft and whether a given landing event exceeds the design limits or regulatory limits, also known as a "hard landing".

BACKGROUND OF THE INVENTION

In order to optimize the design of an aircraft's landing gear to minimize the weight and cost, stress engineers perform detailed design analyses based on the specification for anticipated landing conditions.

The allowable envelope of landing conditions is a multi-dimensional set of conditions related to the speed of descent, attitude, weight, instantaneous accelerations and position of the aircraft during landing. This translates into a multi-dimensional envelope of stresses on different components of the landing gear. If any given landing exceeds the allowable stresses on any given component then that landing gear is deemed to have experienced a "hard landing" and must immediately be taken out of service for additional inspection and potential replacement.

Even though the actual damage to the landing gear is due to a complex combination of landing conditions, the regulatory authorities have attempted to simplify all these conditions into a single factor, the vertical descent rate.

Aircraft, especially transport category aircraft, such as those certified under US federal air regulation part 25, are designed to land at vertical descent rates up to 10 feet per second. The 10 ft/s design case(s) for the aircraft and its landing gear represent a limit load condition. Although certification of the aircraft and landing gear typically requires analysis and testing to descent velocities of 12 ft/s, it is expected that material damage can occur in any landing with a descent rate beyond 10 ft/s. The amount of energy absorbed by the landing gear (damper and structure) and aircraft structure is based on the kinetic energy in the aircraft. This is given by the formula $Ek=\frac{1}{2}mV^2$. As can be seen, the amount of energy depends on both the mass of the aircraft and the aircraft descent velocity, with the energy varying with the square of velocity, hence its importance to determining landing behaviour.

FAA data, shown in FIGS. 1 and 2, has shown that the variation of landing descent rate is similar to that specified in MIL-A-8866 (the sink rate frequency curve commonly used for landing gear design purposes). As can be seen in the data, landings beyond 10 ft/s occur periodically.

The current process for deciding that an aircraft has had a "hard landing", and thus may have compromised the safety and integrity of the landing gear, is based on a subjective assessment by the pilot and flight crew. The pilot determines whether a hard landing has occurred based on the pilot's experience and perception of the landing events. Anecdotal evidence suggests that most pilots are conservative in their determination of hard landings and they tend to report landings as 'hard' that are actually less than 10 ft/sec. Given the low percentage of landings beyond the design threshold indicated by the FAA data, it is not unreasonable to expect that most pilots have not landed at 10 ft/s, hence they have no baseline experience against which a comparison may be made.

Because of the lack of reliable quantitative data, errors may be made in this assessment. As a result, an aircraft may be grounded unnecessarily, at a considerable cost of time and money, or conversely, a damaged aircraft can continue in service, thus potentially compromising public safety.

Once a pilot has reported a "hard landing" the operator immediately grounds the plane and submits the flight data recorder information, aircraft weight, weather conditions, inspection results and other incident data to the airframe manufacturer and/or the landing gear manufacturer for analysis to determine whether or not that landing did, in fact, exceed the design specification for the allowable operating envelope for landings. Conventional flight data recorders do not take all the information required nor use a high enough data acquisition rate to enable a comprehensive and detailed analysis. As a result, in order to be conservative, the limited data often does not allow the manufacturer to waive the "hard landing" report. Therefore, in many instances, the analysis confirms the "hard landing" and the landing gear must be dispositioned according to SAE ARP-4915 which often requires that the landing gear be replaced and quarantined for six months. In extreme cases, additional airframe inspections may also be required.

The ability to quantitatively assess whether a hard landing has taken place is important to the transportation industry in order to reduce the cost of reported hard landings. However, there is an additional reason to have a hard landing indicator.

In an otherwise perfectly smooth landing, the vertical descent velocity results in a given energy depending on the mass (or weight) of the plane. Thus, the regulatory limit of 10 ft/sec determines the allowable passenger and baggage weight on all flights. If this limit were to be reduced slightly (for example from 10 to 9.5 ft/sec), then the allowable passenger and baggage weight can be increased and the airlines can fill more seats and be more profitable.

Since the allowable vertical descent speed directly affects the airline's profitability, this is clearly an issue that warrants attention.

Although various companies have attempted to implement a hard landing detection system in the past, these have largely failed. There are essentially three primary reasons why these systems have failed.

First, a hard landing is not governed exclusively by the vertical descent velocity, it is governed by a complex multi-dimensional array of landing conditions including the aircraft attitude, and position. Thus, even if the vertical descent velocity was accurately measured, the regulatory authorities may hesitate to reduce the vertical descent velocity limit since it is really a proxy measurement of all the multi-dimensional landing conditions that are not being monitored.

Secondly, it is not really the velocity that dictates the landing force, but the acceleration (Force=Mass×Acceleration or F=MA). Thus, measuring the rate of descent cannot really provide accurate force or load calculations, it is really just a substitute or proxy measurement.

Thirdly, some companies have tried to circumvent the need to measure landing conditions and instead measure landing forces directly. One problem with measuring landing forces is that an accurate system would necessitate installation of a large number of sensors in order to capture the complete multi-dimensional array of loads on each component of each landing gear. Furthermore, each landing gear would need this large number of sensors and many of the sensors would need to be placed in areas that would be highly susceptible to damage, thus rendering the data inaccurate and leading to a non-robust and costly system.

SUMMARY OF THE INVENTION

The present invention is a system installed on the aircraft, and not necessarily on the landing gear. The invention allows for measurement of the aircraft attitude and accelerations which allows for a complete reconstruction of the aircraft landing event including position, velocity, and acceleration. Integration with the aircraft avionics system allows the use of lower cost inertial measurement sensors in the landing event recorder. Error propagation during integration (and double integration) of the accelerometers and angular rate sensors may be controlled by correcting to the existing aircraft data.

The present invention provides a system for acquiring aircraft landing conditions, the system being capable of identifying when a hard landing has occurred. The system comprises a plurality of acceleration sensors and a plurality of gyroscopes and a means for measuring and storing data from each sensor. The system compares the data received from the sensors with at least one predetermined threshold parameter and if the data exceeds at least one of the threshold parameters an indicator will identify the occurrence of a hard landing event and/or a possible hard landing that requires further analysis. In addition to the analysis of the acceleration and angular data the system may simultaneously collect data from the aircraft avionics system. Such data may then be used for further analysis along with the data from the acceleration sensors and the gyroscopes to confirm the hard landing event after an indication of such an event has been made. The system may additionally be used to acquire general landing conditions, including aircraft landing impact velocities, accelerations, attitude and impact force.

The present invention also provides an apparatus for determining an aircraft hard landing event and an apparatus for determining aircraft landing impact velocities.

The present invention further provides a method for determining an aircraft landing impact velocity and a method for determining the occurrence of an aircraft hard landing event.

In one embodiment of the present invention, an inertial measurement unit (IMU), comprised of a plurality of acceleration sensors and a plurality of gyroscopes selected from angle and/or angular rate sensors, of the micro electrical machined systems (MEMS) variety are employed as the measurement core. A processor board controls the interface to the aircraft avionics system and the interface to the analog to digital converter board which digitizes the outputs from the IMU.

Using inputs from the aircraft avionics bus, the system starts to measure and record data when the aircraft is on approach, usually signified by the transition of the landing gear state from retracted to extended. The processor board takes measurements of the IMU at high data rates and measurements from the aircraft avionics and records them to memory until the processor board detects from the aircraft avionics that the landing gear has achieved "weight on wheels" that is, when the aircraft weight has settled onto the landing, and a defined forward speed has been achieved. Such information is typically received from the anti-skid braking control unit. Once this information has been received, the processor performs a window comparison on the acceleration data at the point of impact. If any acceleration was outside a predetermined threshold parameter, or "allowable window", an indicator, typically of the magnetic latching variety, would be set to indicate that a hard landing had occurred and the unit will save the data as a file on a removable storage device, such as a compact flash card or PCMCIA card. Detailed analysis of the landing event can then be performed using a separate ground based computer system to download the data from the removable storage device, and then to reconstruct the flight path.

In another embodiment, an inertial measurement unit (IMU) comprised of a plurality of acceleration sensors and a plurality of gyroscopes selected from angle and/or angular rate sensors are used. A processor takes measurements from the IMU at high data rates generally from the beginning of the aircraft on approach to landing until a final signal is received to show that the landing has occurred. The processor then compares the data from the IMU with a predetermined threshold parameter or envelope of threshold parameters. If the data from the IMU exceeds that of the predetermined threshold then an indicator will indicate that a hard landing has occurred. The data received from the IMU will then be available for further analysis.

In one aspect the present invention provides a system for acquiring aircraft landing conditions comprising a plurality of acceleration sensors, a plurality of gyroscopes selected from the group consisting of angle sensors and angular rate sensors, a means for measuring and storing data from said acceleration sensors and gyroscopes at high data rates coupled to each of the sensors, and means for comparing the stored data from said acceleration sensors and gyroscopes with at least one threshold parameter that when exceeded indicates that the data received from the acceleration sensors, gyroscopes must be further analysed to ascertain if a hard landing has taken place, the means for comparing the stored data being adapted to couple to said sensors for receiving data therefrom. The high data rates may be greater than 32 Hz, or greater than 50 Hz or greater than 100 Hz.

The system may further comprise means for measuring and storing data from the aircraft avionics bus, the means being adapted to couple with the aircraft avionics bus, the aircraft avionics data being further analysed along with the stored data from said acceleration sensors and gyroscopes to confirm the hard landing indication. The means for comparing may further comprises an indicator, chosen from is at least one of a display screen located in the cockpit, an indicator light located within the aircraft, and an electronic transmission to a ground-based system, for indicating when the data has exceeded the at least one threshold parameter The system may further comprise at least one additional data measurement for further analysis to increase the accuracy and redundancy of the system, the data measurement may be obtained from at least one of a strain transducer located on the landing gear, a pressure transducer located on the landing gear shock strut and a shock strut position indicator located on the landing gear. The means for comparing the stored data may further comprise at least one secondary threshold parameter for comparison with the stored data, wherein if the at least one secondary threshold parameter is exceeded the indicator indicates that a hard landing has taken place.

In an alternative aspect, the present invention provides a method for determining the aircraft landing impact velocities comprising the steps of (i) determining aircraft attitude using at least one gyroscope; and (ii) integrating high rate acceleration data based on aircraft reference frame information to determine integration limits.

In an alternative embodiment, the present invention provides a method for determining an aircraft landing condition comprising the steps of (i) measuring and storing data from a plurality of acceleration sensors at greater than 32 Hz, (ii), measuring and storing data from a plurality of gyroscopes selected from the group consisting of angle sensors and angular rate sensors at greater than 32 Hz; (iii) measuring and storing information from the aircraft avionics bus; and (iv) processing the data from the sensors and the gyroscopes and the aircraft avionics bus information to calculate a prescribed aircraft landing condition. The prescribed aircraft landing condition may be one of impact velocity, airplane attitude, accelerations, and position of the aircraft during landing and the method may include the further step of comparing the calculated aircraft landing impact velocity with at least one predetermined threshold value correlating to an allowable landing velocity.

In an alternative aspect the invention provides an apparatus for determining an aircraft hard landing event comprising a housing mountable in an aircraft having at least one connector allowing interface between the housing and the aircraft power and optionally the aircraft avionics systems, an inertial measurement unit located within the housing, processing means coupled to the inertial measurement unit for receiving data therefrom, the processing means including data correlating to at least one threshold parameter for comparison with the data received from the inertial measurement unit to identify when a hard landing has occurred; and an indicator coupled to the housing and connected to the processor for indicating the occurrence of a hard landing.

The apparatus may further comprise an avionic bus interface circuit located within the housing and adapted to couple to the aircraft avionics system and receive and process data therefrom. The apparatus may also comprise a removable memory card for storing data and the indicator may be selected from an incandescent indicator and a magnetic latching indicator located on an external surface of the housing.

The present invention also provides a method for determining the occurrence of an aircraft hard landing event comprising the steps of (i) recording and processing data received from an inertial measurement unit, (ii) recording and processing data received from an aircraft avionic bus, (iii) comparing the processed data from the inertial measurement unit to at least one predetermined threshold parameter; and (iv) analyzing the data from the inertial measurement unit and the aircraft avionic data bus if the data from the inertial measurement unit exceeds one of the at least one threshold parameters.

In an alternative embodiment the present invention provides an apparatus for determining an aircraft landing impact velocity comprising an inertial measurement unit, an avionics bus interface circuit adapted to couple to the aircraft avionics bus and processing means coupled to the inertial measurement unit and the avionics bus interface circuit and operable to measure and store data from the inertial measurement unit at high data rates and operable to measure and store information from the aircraft avionics bus and further operable to process the data and the information to calculate the aircraft landing impact velocity.

In an alternative embodiment the present invention provides an apparatus for determining an aircraft hard landing event comprising a housing mountable in an aircraft having at least one connector allowing interface between the housing and the aircraft power and optionally the aircraft avionics systems, a plurality of acceleration sensors, a plurality of gyroscopes selected from the group consisting of angle sensors and angular rate sensors, processing means coupled to the sensors and the gyroscopes for receiving data therefrom, the processing means including data correlating to at least one threshold parameter for comparison with the data received from the sensors and the gyroscopes to identify when a hard landing has occurred and an indicator coupled to the housing and connected to the processor for indicating the occurrence of a hard landing.

The present invention further provides a method for determining an aircraft landing impact velocities and comparing it to a predetermined landing velocity comprising the steps of (i) measuring and storing data from a plurality of acceleration sensors at greater than 32 Hz, (ii) measuring and storing data from a plurality of gyroscopes selected from the group consisting of angle sensors and angular rate sensors, (iii) measuring and storing information from the aircraft avionics bus, (iv) processing the data from the sensors and the gyroscopes and the information from the aircraft avionics bus information to calculate the aircraft landing impact velocity and (v) comparing the calculated aircraft landing impact velocity with at least one predetermined threshold value correlating to an allowable landing velocity.

The present invention further provides a method for determining a prescribed aircraft landing condition comprising the steps of (i) measuring and storing data from a plurality of acceleration sensors at greater than 32 Hz, (ii) measuring and storing data from a plurality of gyroscopes selected from the group consisting of angle sensors and angular rate sensors at greater than 32 Hz, (iii) measuring and storing information from the aircraft avionics bus, (iv) processing said sensor data and said aircraft avionics bus information to calculate a prescribed aircraft landing condition.

In a further aspect, the present invention provides a system for identifying an aircraft hard landing comprising means for measuring and storing data received from an acceleration sensor and an angular rate sensor at high data rates, and means for comparing the stored data from said acceleration sensor and angular rate sensor with at least one threshold parameter that when exceeded indicates that a hard landing has occurred, the means for comparing the stored data being adapted to couple to said sensors for receiving data there from.

In an alternative arrangement, the system comprises a plurality of sensing units (each with a plurality of angular rate sensors and accelerometers arranged to function as an inertial measurement unit). The output of each sensing unit is provided to a further central processing unit which performs the analysis and decision making for the system. The central processing unit can be specific to the hard landing detection system or may be a unit already installed on board an aircraft. Data transmission between the sensing unit and the central processing unit can be in either the analog domain or in the digital domain. The plurality of sensing units can be arranged such that each sensing unit is in close proximity to the landing gear or its mounting in the aircraft, or alternatively on the unsprung mass of each landing gear (such as attached to the axle). Additionally, a sensor may be placed near the aircraft nominal centre of gravity.

BRIEF DESCRIPTION OF THE DRAWINGS

The present invention will be described further below with reference to the following figures:

FIGS. 1 and 2 are graphs illustrating FAA Sink Rate Data;

DETAILED DESCRIPTION OF THE PREFERRED EMBODIMENTS

Figure 3:
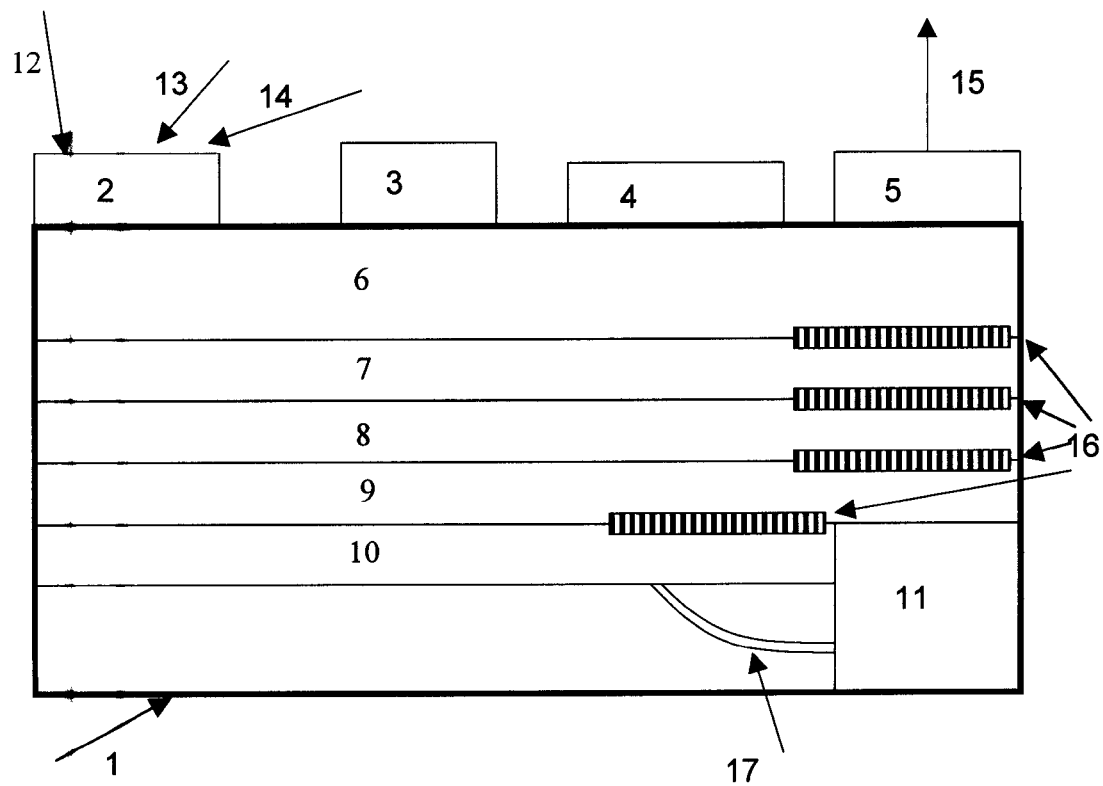
FIG. 3 is a diagram illustrating one embodiment of the system of the present invention contained within a housing.

This invention allows for the precise determination of an aircraft's landing conditions and whether an aircraft has experienced a hard landing that exceeds the allowable design loads of the aircraft's landing gear.

The system comprises a computer that measures signals from an inertial measurement unit (IMU) at high data rates and may also record signals from the aircraft avionics data bus. The IMU includes a plurality of acceleration sensors and a plurality of gyroscopes. The use of the term "gyroscope" will be understood to encompass the use of the terms "angle sensor" and "angular rate sensor" and that all these terms can be used interchangeably. In the description of the embodiments the term angular rate sensor will be used.

In one embodiment the IMU comprises at least three acceleration sensors and at least three angular rate sensors. As discussed above, the angular rate sensors may be interchangeable with an angle sensor. In addition a gyroscope may be used in the place of an angular rate sensor.

The signals from the inertial measurement unit are measured at high data rates, for example greater than 32 Hz. The signals may be measured at rates greater than 50 Hz and at rates greater than 100 Hz. The signals from the aircraft avionics data bus are typically furnished at 8 Hz. The recording of the signals may be initiated by a particular event, herein referred to as a recording event. This predetermined recording event may be, for example, a signal to identify that the landing gear has been extended. The recording of the signals will end when a signal is received to identify a second predetermined event, referred to herein as a predetermined landing event. This predetermined landing event may be, for example, a signal that indicates that landing is complete such as achieving a known wheel speed.

The computer compares the output from the inertial measurement unit against at least one predetermined threshold parameter to determine whether the aircraft's three dimensional landing deceleration is safely within the design allowances or other regulatory limitations, or whether the landing event needs further investigation. The predetermined threshold parameters are calculated for each aircraft based on the design of the aircraft. The comparison of the IMU data to the threshold parameter may be a comparison of a compilation of values, discussed below, or may be a comparison of one of the values, i.e. aircraft acceleration rate. The threshold parameter may be based on a compilation of values to represent the aircraft's three dimensional threshold, such measurements are generally described as the aircraft attitude and include measurements of the aircraft's position about a fixed axis, including the aircraft pitch, roll and yaw.

The threshold parameter may be based on simple measurements, such as a maximum acceleration in a certain direction, or a limit speed at a given point. Alternatively, the threshold may be based on the multidimensional nature of the measurements (comprising three angle measurements and three acceleration measurements). To arrive at the threshold values for the accelerations, a complex set of analyses must be performed. These analyses include a stress analysis of the structure of the landing gear to determine critical load cases in each force loading direction and in combination, modelling of the landing gear in the aircraft to determine what aircraft event must occur to generate those forces. This aircraft model is generally idealized, so a further evaluation must be applied to convert the aircraft level behavior into the expected behavior at the measurement site (taking into account the aircraft flexibility and energy absorption). At this point, allowable measurements at the sensor unit site(s) will be available. A further calculation may be applied to allow for the calibrated sensor responses (i.e. the threshold for a given sensor unit is based on allowable landing gear behaviour, aircraft motion, aircraft flexibility, and the peculiarities of the particular sensor unit). Additional measurements may be taken into account that will increase the number of dimensions in analysis (aircraft mass, which may be queried from the aircraft data bus, and landing gear piston position will directly affect both the allowable loads and how the aircraft model will related aircraft motion to landing gear loads).

In addition to a threshold parameter being set that when exceeded identifies a hard landing event has occurred, several additional threshold parameters may be set to identify varying levels of damage once the hard landing event has been identified. Examples of different threshold parameters include a measurement that when exceeded identifies possible damage to the landing gear may have occurred and/or an additional measurement that when exceeded indicates possible damage to the fuselage may have occurred.

For example, if an acceleration measurement is beyond the predetermined acceleration threshold, an indication may be provided to announce that the complete landing data must be analyzed to determine whether the landing was indeed 'hard' and therefore beyond the design or regulatory limits. The complete landing data includes the time history of the IMU plus the time history of aircraft data bus information, for example aircraft attitude, ground speed, steering angle, etc. Alternatively, if an acceleration measurement is beyond a second predetermined acceleration threshold, an indication may be provided that a hard landing has occurred and that damage to the landing gear may have been sustained.

The analytical determination of hard landing relates to the use of the recorded IMU data and aircraft avionic bus data to reconstruct the approach and landing by numerically integrating from the last measurement point and taking the aircraft reference frame information as the integration boundary conditions. The aircraft avionic bus data includes landing gear state (retracted or extended), landing gear weight on wheels status, nose wheel steering angle, wheel speed, aircraft attitude, aircraft reference acceleration, radar altimeter height above ground, aircraft position, and time. It is not necessary to obtain all of the aircraft avionic bus data for complete analytical determination, however, such information should include the aircraft attitude data. With the high data rate reconstruction, the exact details of the landing attitude, speeds, and accelerations can be compared against the design limits. Use of the aircraft data bus information allows tight bounds to be kept on IMU error propagation. In an alternate embodiment, the system can perform the numerical integration immediately upon detection of a 'landing end' event, to determine the descent velocity immediately prior to impact. This information can be used as part of the hard landing threshold determination, or to provide monitoring means to permit aircraft to operate with increased landing weights (e.g. by monitoring the aircraft landing impact velocity to ensure regulatory compliance if the increased passenger weight requires a limit of 9.5 ft/sec instead of 10 ft/sec). The analytical determination of the hard landing may occur within the apparatus on the aircraft or the data needed for the analysis may be stored on a removable memory card and the data analysed elsewhere.

The system will now be described in further detail. In one embodiment, shown in FIG. 3, the system is housed in an avionics housing (1) that is designed to be mounted in an non-pressurized area near the centre of gravity of the aircraft. The housing has a plurality of connectors (2, 5) that allow interface to the aircraft power indicated at arrow 12 (12), and aircraft avionics systems indicated at arrows 13, 14 (13, 14) that can be logic level inputs, or standard avionics busses such as ARINC-429 or MIL-STD-1553. The connectors also allow for communication with external systems where necessary, for example to allow for debugging of the system and/or data downloading, illustrated generally at arrow 15. A removable memory card such as a Compact Flash or PCMCIA rugged card is provided in a sealed slot (4) such that recorded data may be removed from the unit with a minimum of effort. Additionally, a debug or download connection is provided through one of the connectors such that the status of the onboard electronics can be determined using a serial interface (such as RS-232 or RS-485) or data downloaded through that port. An indicator (3) is provided on the exterior of the housing to indicate whether the aircraft has experienced a hard landing or potential hard landing that requires further analysis. The indicator may also be located away from the housing with a connection to the processor and/or housing. Additionally, some pins in a connector are dedicated to providing a remote connection for an indicator to be mounted in another area of the aircraft (potentially in a maintenance bay or the cockpit). The indicator can be of the incandescent variety, an LED, or preferably, a magnetic latching indicator of the type provided by L-3 Communications, Electrodynamics division.

All electrical connections made externally to the connectors are routed internally to a dirty cavity (6) which is a 'box within a box' made of metal that contains the power conditioning, electromagnetic inference control circuitry, and protection circuitry to deal with lightning strike mitigation and high intensity radio field energy absorption. Circuitry within the dirty cavity ensures that the signals fed to the clean cavity (comprised of the section within the housing, but outside of the dirty cavity) are of an appropriate voltage and current level so as to not harm the delicate electronic circuitry found in the clean cavity. The distinction between the dirty cavity and the clean cavity does not need to be made by separation of the components into physical compartments. However, the signals fed to the components discussed below as being located in the clean cavity should be of an appropriate voltage and current level so as not to harm any of the "clean cavity" components.

Within the clean cavity is a printed circuit board containing the microprocessor (7) and its support circuitry (e.g. clock, voltage sequencing, non volatile memory, and random access memory). Each board within the clean cavity is connected to the next using internal connectors (16) which may, where required, be of the filter pin variety (especially at the connection between the dirty cavity and the clean cavity).

Also within the clean cavity are the avionics bus interface circuit and digital interface circuit (8), the analog to digital conversion circuit board (9), and an analog signal conditioning board (10) to amplify and filter the analog signals appropriately. An inertial measurement unit (11) is also provided within the clean cavity. In addition, it will be understood that the system also includes internal wiring indicated at 17, where appropriate to connect the components of the system.

The inertial measurement unit is designed to provide three dimensional acceleration measurements and a measurement of rotation rates about the three dimensions. In the preferred embodiment, this IMU is comprised of low cost, high reliability sensors fabricated using a MEMS process. A plurality of acceleration sensors are provided to measure in each axis, each sensor being placed to provided redundancy of measurement, or filtered or specified differently to provide a mixture of measurements—low speed, low noise; high speed with slightly higher noise, or a mixture of high range and low range sensors. In the preferred embodiment, each axis of measurement has five parameters:—±1.7 g acceleration low pass filtered to 10 Hz, ±1.7 g acceleration low pass filtered to 100 Hz, ±35 g acceleration low pass filtered to 100 Hz, a 300°/s rotational rate gyroscope, and a temperature output. Each sensor has a self test capability afforded by electrostatically offsetting the measurement bridge. The sensors may be of the surfaced micro-machined silicon variety provided by Analog Devices. Additional accelerometers may be used beyond those located in the IMU. Such additional accelerometers may be placed in the aircraft, for example on each of the landing gears, in order to allow for corrections due to any fuselage bending or damping modes.

The preferred embodiment operates by monitoring all channels from the IMU, and the following values from the aircraft avionics bus: landing gear state (retracted or extended), landing gear weight on wheels status, nose wheel steering angle, wheel speed, aircraft attitude, aircraft reference acceleration, radar altimeter height above ground, aircraft position, and time. The information from the IMU and the aircraft avionics bus may be monitored and processed simultaneously or each value may be recorded and processed in turn (e.g. using a multiplexer).

Figure 4:
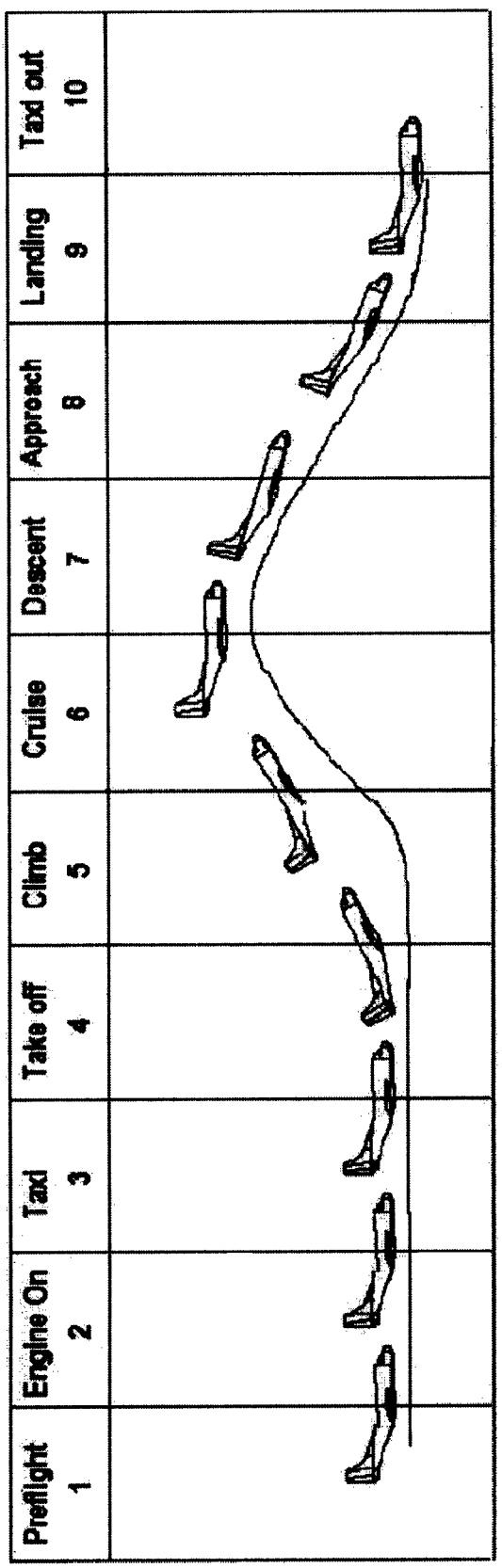
FIG. 4 illustrates the general procedure and path of an aircraft from pre-flight to taxi out.

The usual flight path of an airplane from pre-flight to taxi out is illustrated in FIG. 4. The final approach to taxi out is further illustrated in FIG. 5 including identification of the different monitoring stages of the system of the present invention.

Depending on the landing gear state, the system will either be in an active recording mode, or a passive monitoring mode. In the passive monitoring mode, the system performs self test operations and waits to observe a transition from landing gear retracted to landing gear extended, signifying that the aircraft is on approach to the runway. At this point the system transitions to the active monitoring mode, identified at stage 8 in FIG. 5, recording all channels from the IMU at high data rates (100 Hz), and all parameters from the aircraft avionics (also recorded at high data rates, despite the underlying 8 Hz rate that some parameters are provided at). The system records all parameters until the following condition is true: weight on wheels (signifies aircraft on the ground), nose wheel angle 0° (signifies aircraft rolling straight), and known wheel speed (may be a transition of a logic signal, or continuous value from the anti lock brake control system), corresponding to stage 9d in FIG. 5. At this point the system stops recording the landing event and saves the data file to the removable memory card.

Figure 5:
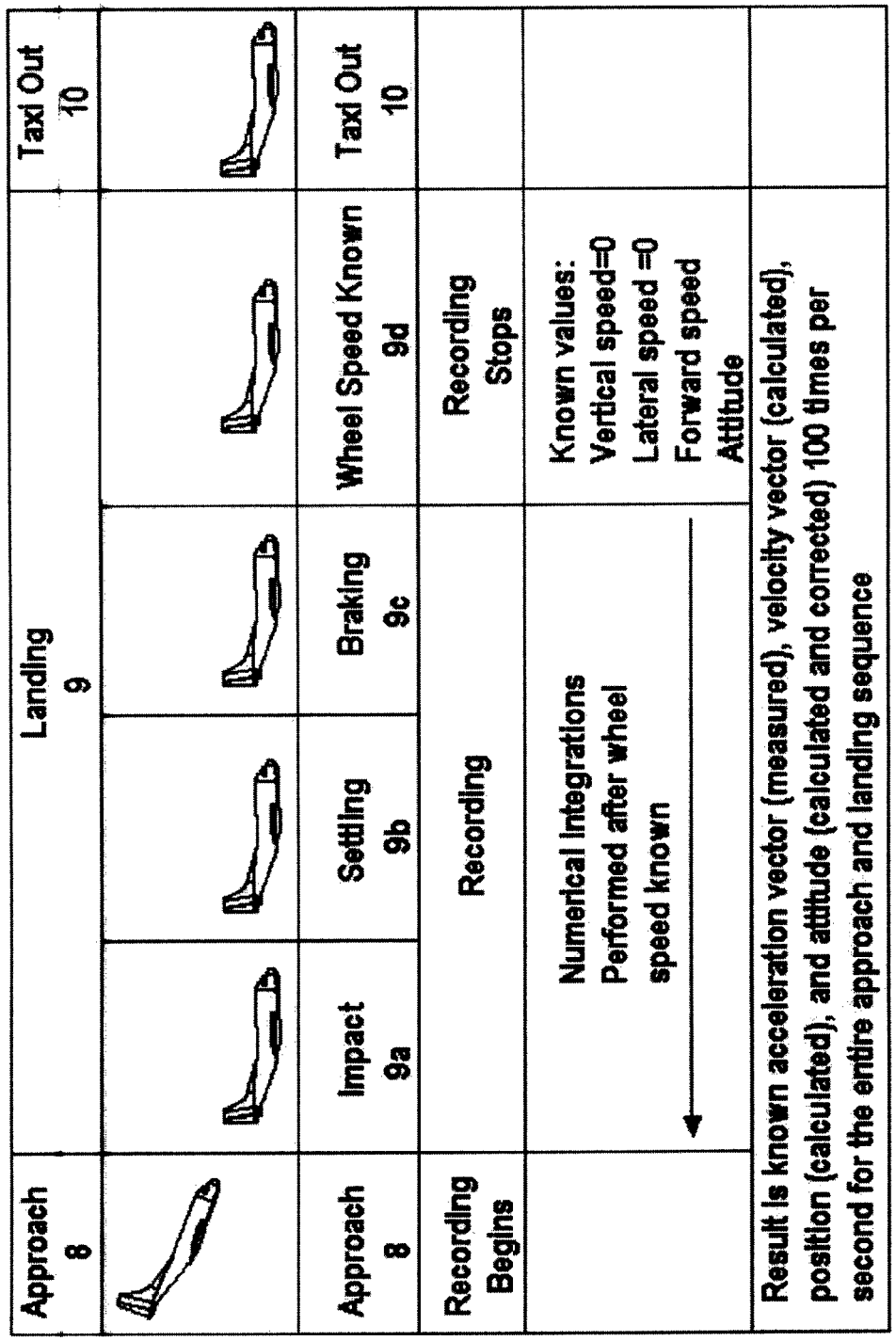
FIG. 5 further illustrates the approach to taxi out portion of the path illustrated in FIG. 4.

The computer then performs an analysis based on the recorded data. Starting with the end of landing point, where forward velocity is known (from the wheel speed indication), and aircraft attitude is known from the on board reference system, the processor can perform inertial measurement calculations to calculate the aircraft flight path back from the measurement stop point, as illustrated in FIG. 5. Based on vertical acceleration spike information, the processor can determine the point of impact. A window comparison is then performed to determine whether the three dimensional acceleration recorded at that point is within the allowable landing envelope.

At this point, there are three possible actions that can be taken. If the landing was well inside the allowable landing envelope, then the landing was clearly not a hard landing and any potential pilot hard landing report may be immediately waived. If the landing is clearly outside the allowable landing envelope, then the landing is clearly a hard landing and immediate steps must be taken. If the landing is in the intermediate condition, then a potential hard landing has occurred and the removable memory card is sent to the landing gear manufacturer for detailed analysis and reporting.

Several mathematical processes are performed to convert the measurements to information. The high rate data from the rate gyroscopes needs to be numerically integrated to convert the degrees per second output to degrees of rotation about all axes of the aircraft. Because the chosen high data rate sensors experience considerable 'drift', the temperature measurement made on the IMU is used to correct for the drift, and the aircraft avionics attitude measurement may be used to periodically correct the drift of the high rate sensors. A Kalman filtering algorithm may be employed to merge the two types of sensors into one high accuracy, high data rate signal.

Once aircraft attitude is determined for all measurement points during the landing event, the measured accelerations can be mathematically converted to the appropriate reference frame, and single and double integrations performed to yield the velocity vector and the three dimensional position of the aircraft at all points during the approach and landing. This information, particularly the velocity vector can be used to determine not just the vertical descent speed, but also the side slip speed, and the forward speed of the aircraft, all of which play pivotal roles in the determination of a hard landing.

The system and apparatus described herein may also include a self check component. The inertial measurement unit may include a built in self check system which allows for each of the sensors contained within the IMU to perform a self check. Therefore, as well as generating data for processing, the sensors in the IMU may also undergo scheduled self checks. For example, a measurement scheme could include the generation of a measurement from each of the sensors in the IMU followed by a self check performed by each sensor and repetition of this pattern.

The calculations used to determine the aircraft flight path are performed in two stages. First, the aircraft attitude for the time history of data needs to be calculated. This is done by starting at the end of the data, corresponding to stage 9d in FIG. 5. At this point, aircraft attitude is known (either from the aircraft avionics, or by assumption to be level in roll and pitch, and to be heading straight down the runway). The output from the rotational rate sensors is integrated numerically from this known starting point to determine the attitude of the aircraft (the angles in roll, pitch, and yaw) for the entire time history. To avoid unrestricted error growth due to 'gyro drift' (the tendency of the angular rate sensors to provide increasing error with time), the attitude data can be corrected periodically to the aircraft data provided on the avionics bus. This can be done coarsely by only using the high rate data, from the angular rate sensors, to integrate between the 'holes' in the low rate data, from the aircraft avionic data, or by using a filtering technique such as a Kalman filter. The result of this integration is a complete time history of aircraft attitude for the entire approach and landing phase.

The second series of calculations that are applied to the data are a reference frame adjustment to correct the acceleration measurements from the aircraft reference frame to a ground based reference frame. Then, the adjusted acceleration data is numerically integrated once, starting from the end point data (stage 9d in FIG. 5), and using the known values at that point as integration start values (forward speed known, vertical speed known to be zero, side speed known to be zero). The numerical integrations can then be calculated from stage 9d, illustrated in FIG. 5, through to the beginning of the recording of data. The result of this integration is a complete time history of the approach and landing phase of the aircraft speeds in three dimensions, known collectively as the aircraft velocity vector. If desired, the velocity data can be further integrated to yield position information. This may be of value especially in those instances where the aircraft touched down off of the runway.

The time histories thus yielded provide a complete picture of the aircraft during approach and landing: the aircraft velocity vector (calculated), the aircraft acceleration vector (measured), the aircraft position (calculated) and the aircraft attitude (calculated and corrected). These results may be known (measured, calculated and/or corrected) 100 times per second for the entire approach and landing sequence. From this data, comparisons can be made to the design specifications to determine the intensity of the landing manoeuvre.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. It is therefore contemplated that the appended claims will cover any such modifications or embodiments. Further, all of the claims are hereby incorporated by reference into the description of the preferred embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. An apparatus for determining an aircraft hard landing event comprising: a housing mountable in an aircraft having at least one connector allowing interface between the housing and the aircraft power and optionally the aircraft avionics systems; an inertial measurement unit located within the housing; processing means coupled to the inertial measurement unit for receiving data at high data rates therefrom, the processing means including data correlating to at least one threshold parameter for comparison with the data received from the inertial measurement unit to identify when a hard landing has occurred; and an indicator coupled to the housing and connected to the processor for indicating the occurrence of a hard landing, wherein the processing means includes an active recording mode and a passive monitoring mode, the active recording mode being initiated by a predetermined recording event and comprising the receiving and storing of data from the inertial measurement unit and the aircraft avionics system until a predetermined landing event initiates the passive monitoring mode which comprises the processor performing at least one self check.

2. The apparatus according to claim 1, further comprising an avionic bus interface circuit located within the housing and adapted to couple to the aircraft avionics system and receive and process data therefrom.

3. The apparatus according to claim 1, wherein the processing means is additionally coupled to the avionic bus interface circuit for receiving data therefrom.

4. The apparatus according to claim 1, further comprising a removable memory card for storing data thereon.

5. The apparatus according to claims 1, wherein the indicator is selected from an incandescent indicator and a magnetic latching indicator.

6. The apparatus according to claim 1, wherein the indicator is located on an external surface of the housing.

7. An apparatus for determining an aircraft hard landing event comprising: a housing mountable in an aircraft having at least one connector allowing interface between the housing and the aircraft power and optionally the aircraft avionics systems; a plurality of acceleration sensors; a plurality of gyroscopes selected from the group consisting of angle sensors and angular rate sensors; processing means coupled to the sensors and the gyroscopes for receiving data therefrom, the processing means including data correlating to at least one threshold parameter for comparison with the data received from the sensors and the gyroscopes to identify when a hard landing has occurred; and an indicator coupled to the housing and connected to the processor for indicating the occurrence of a hard landing, wherein the processing means includes an active recording mode and a passive monitoring mode, the active recording mode being initiated by a predetermined recording event and comprising the receiving and storing of data from the inertial measurement unit and the aircraft avionics system until a predetermined landing event initiates the passive monitoring mode which comprises the processor performing at least one self check.

8. The apparatus according to claim 7, further comprising an avionic bus interface circuit located within the housing and adapted to couple to the aircraft avionics system and receive and process data therefrom.

9. The apparatus according to claim 7, wherein the processing means is additionally coupled to the avionic bus interface circuit for receiving data therefrom.

10. The apparatus according to claims 7, further comprising a removable memory card for storing data thereon.

11. The apparatus according to claim 7, wherein the indicator is selected from an incandescent indicator and a magnetic latching indicator.

12. The apparatus according to claim 7, wherein the indicator is located on an external surface of the housing.

* * * * *